United States Patent [19]

Lian et al.

[11] 3,742,685
[45] July 3, 1973

[54] LAWN MOWER WITH HYDROSTATIC DRIVE

[75] Inventors: John R. Lian, Stratford; Simo A. O. Pennila, Milford, both of Conn.

[73] Assignee: Stellar Industries, Inc., Bridgeport, Conn.

[22] Filed: Dec. 29, 1971

[21] Appl. No.: 213,389

[52] U.S. Cl. ................... 56/7, 56/11.1, 56/11.4, 56/13.6
[51] Int. Cl. ............................................. A01d 75/30
[58] Field of Search ............... 56/6, 7, 13.6, 10.9, 56/11.1, 11.4, 11.5, 11.7, 11.8, 11.9

[56] References Cited
UNITED STATES PATENTS 3,579,965  5/1971  Musgrove ........................... 56/7
3,563,012  2/1971  Strasel ................................. 56/7

Primary Examiner—Louis G. Mancene
Assistant Examiner—J. A. Oliff
Attorney—D. Verner Smythe et al.

[57] ABSTRACT

A gang lawn mower includes a plurality of reel-type lawn mowers attached to a tractor and a prime mover is mounted in the tractor. One hydrostatic transmission drivingly connects the output of the prime mover to the ground wheels of the tractor to drive the tractor and a second hydrostatic transmission drivingly connects the output of the prime mover to the lawn mower reels. The lawn mower reels are thus driven independently of the speed of the tractor.

8 Claims, 5 Drawing Figures

LEGEND
- LOW PRESSURE
- RESERVOIR OIL
- HIGH PRESSURE
- AUXILIARY PRESSURE OIL

INVENTORS
JOHN R. LIAN
SIMO A. O. PENNILA
BY
Smythe & Moore
ATTORNEYS

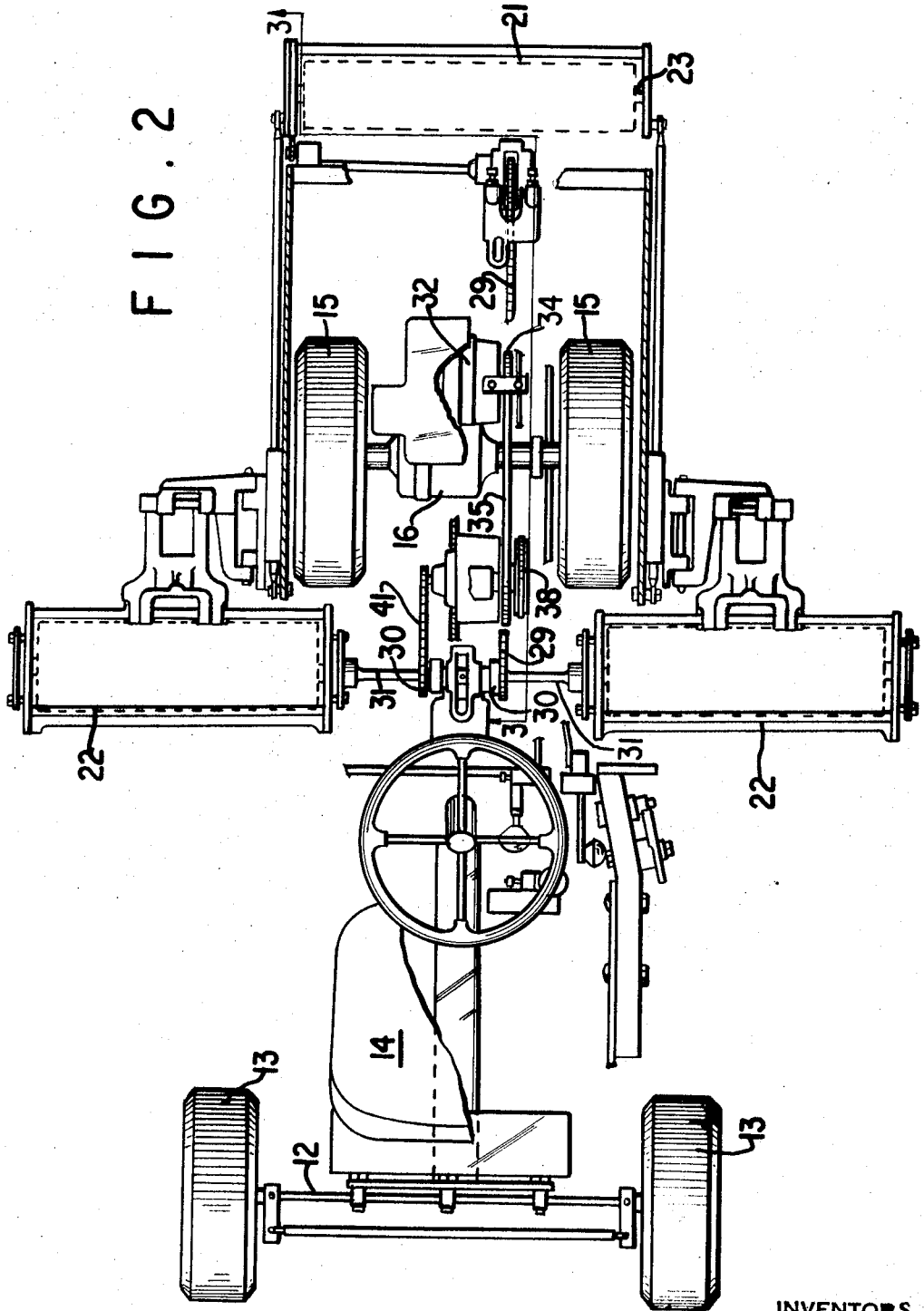

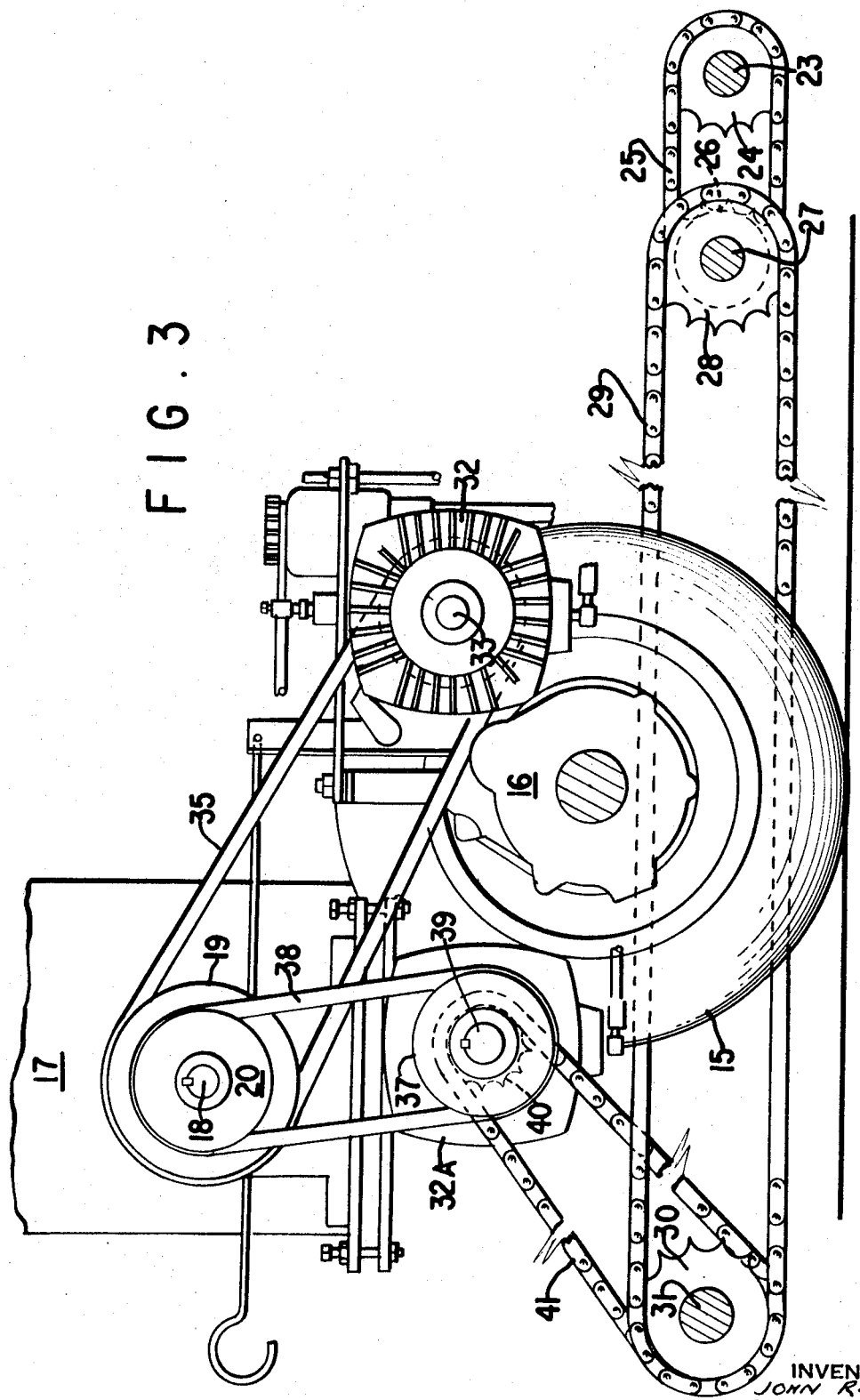

LAWN MOWER WITH HYDROSTATIC DRIVE

The present invention relates to lawn mowers, especially of the gang type, and particularly to a hydrostatic drive for the ground wheels and mowing unit or units.

Gang lawn mowers wherein a plurality of reel-type lawn mowers or units are mounted on a tractor are known. Gang lawn mowers are particularly useful for heavy duty operation, such as would be encountered in the cutting of large areas of grass. These applications might include the cutting of golf courses or large lawns of private estates or in industrial plants. The lawn mower units are generally mounted with one unit at the front of the tractor and two units on opposite sides thereof. Alternately, two units can be in front of the wheels and one unit between the front and rear wheels. Also, there can be one unit between the front and rear wheels and two or more units behind the rear wheels. The lawn mower units are all drivingly connected from a prime mover which is on the tractor and under the control of the tractor operator. The prime mover is also drivingly connected to the tractor wheels so as to move the tractor over the ground at a predetermined speed.

The driving connections between the prime mover, the ground wheels of the tractor, and the lawn mower units may be direct, such as the use of drive chains, sprockets, belts, flexible shafts, and universal drive shafts. It has also been proposed to use a hydrostatic transmission between the prime mover and the tractor ground wheels and lawn mower units.

Previously known driving connections between the prime mover, the ground wheels, and the lawn mower units, whether of the mechanical or hydrostatic type, have the disadvantage that the speed at which the lawn mower units or reels operate is dependent upon the speed at which the tractor is driven. It is naturally desired that the lawn mowers operate at a nearly constant speed for more effective and uniform cutting of the grass. However, such a uniform speed is particularly difficult to obtain when the lawn is hilly, such as would be the situation in a golf course.

It has subsequently been proposed to connect independently the tractor ground wheels and the lawn mower units to the prime mover through suitable transmissions. However, the transmissions which have been used to date for this purpose have not been generally satisfactory since it has been difficult to obtain a delicate control over the tractor speed and the lawn mower unit reel speed wherein these speeds are independent of each other.

One of the objects of this invention is to provide an improved drive for the ground wheels and a variable reel speed depending upon the different grass and the frequency of cut desired.

Another object of this invention is to provide a hydrostatic drive arrangement for a gang lawn mower.

A still further object of the invention is to provide a drive for a gang lawn mower wherein the speeds of the lawn mowers and the tractor ground wheels may be controlled independently.

In one aspect of the invention, a gang lawn mower of the type having a tractor and a plurality of lawn mower units attached to the tractor is provided with a prime mover which is operable at variable speeds. The tractor has ground wheels and a differential. A first hydrostatic transmission is drivingly connected between the prime mover and the differential to drive the ground wheels. A second hydrostatic transmission is also drivingly connected to the prime mover and the plurality of lawn mower units so that the driving speed of the reels of the lawn mower units is independent of the speed at which the tractor is driven. The lawn mower units are of the reel type. Both the lawn mower units and the differential of the ground wheels are drivingly connected by drive chains, flexible shafts, belts and universal drive shafts to the outputs of their respective hydrostatic transmissions.

The tractor engine can be operated at a relatively high speed, and by moving the tractor speed control lever which controls the speed through the hydrostatic transmission, the operator can select a lower ground speed to permit maximum horse power to the tractor wheels.

Also, the reels can be driven in reverse direction while the wheels are stationary so that the reel cutting edges can be power lapped.

These and other objects, advantages and features of the invention will become apparent from the following description and drawings which are merely exemplary.

In the drawings:

FIG. 2 is an enlarged top plan view of the lawn mower of FIG. 1 with portions thereof cut away to illustrate the driving connections between the prime mover, the hydrostatic transmissions, the wheels, and the lawn mower units;

FIG. 3 is an enlarged sectional view taken along the line 3—3 of FIG. 2 showing in elevation the driving connections between the prime mover, the hydrostatic transmissions, the ground wheels, and the lawn mower units;

Proceeding next to the drawings wherein like reference symbols indicate the same parts throughout the various views, a specific embodiment of the present invention will be described in detail.

Figure 1:
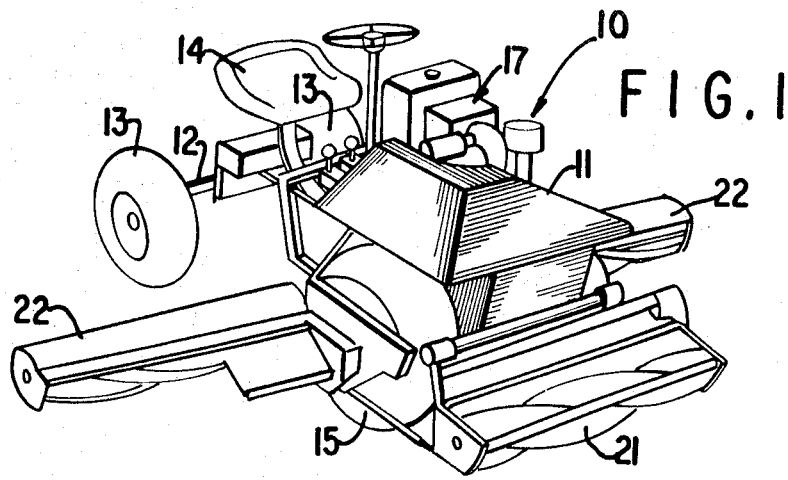
FIG. 1 is an overall perspective view of a lawn mower incorporating the present invention.

As may be seen in FIG. 1, the reel lawn mower incorporating the present invention is indicated generally at 10 and comprises a tractor 11 to which is detachably connected a riding sulky 12 supported on free rotating wheels 13 and having a seat 14. A gang or multiple unit is shown but the principles of the invention could be applied to a single unit mower.

The tractor 11 is supported on a pair of driven ground wheels 15 interconnected by a differential 16 (FIGS. 2, 3). Also mounted on the tractor is a prime mover 17 which may comprise the conventional air cooled gasoline engine of a suitable power capacity. THe prime mover is provided with an output shaft 18 upon which are fixedly mounted a pair of driving sprockets 19 and 20. The prime mover is of the variable speed type and is provided with suitable controls including a throttle which can be readily operated by the operator to control the speed of the prime mover.

Attached to the tractor is a front mower unit 21 and side mower units 22. The units are supported by a flowing suspension so as to be counterbalanced in order to provide for an even cut to follow the natural contour of the ground. The mower units are of the reel type which comprise a plurality of cylindrical spiral blades of heat treated carbon steel. The reel of the front mower 21 is mounted on a shaft 23 having a drive sprocket 24 thereon which is drivingly connected by means of chain 25 to a drive sprocket 26 on a shaft 27 journaled in the forward end of the tractor. A second sprocket 28 is mounted on the other end of the shaft 27 and is drivingly connected by drive chain 29 to a sprocket 30 mounted on a shaft 31 on the ends of which are connectable to the reels of side cutters 22.

Figure 5:
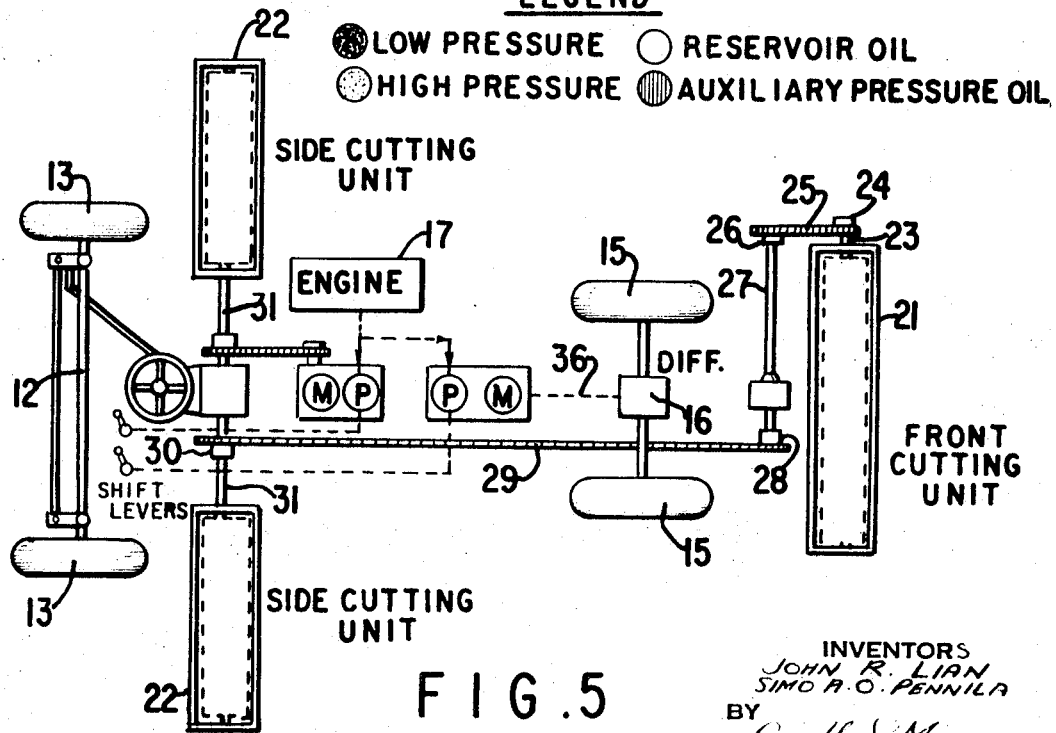
FIG. 5 is a top plan diagrammatic view of the tractor incorporating the present invention showing the several driving connections.

Two separate and independent drives are provided for driving the mower reels and the ground wheels of the tractor from the prime mover. These drives comprise hydrostatic transmissions 32 and 32A which respectively transmit power from the prime mover to the ground wheels 15 and from the prime mover to the reels of the mower units 21 and 22. The hydrostatic transmission 32 is provided with an input shaft 33 upon which is mounted a sprocket 34 which is drivingly connected by drive chain 35 to the drive sprocket 19 on the output shaft of the prime mover. The output shaft of the hydrostatic transmission 32 is not shown in the drawings but is suitably connected to the differential as indicated at 36 in FIG. 5.

The hydrostatic transmission 32A is similarly provided with an input shaft upon which is mounted a sprocket 37 which is drivingly connected by chain 38 to drive sprocket 20 on the output shaft of the prime mover. The transmission 32A has an output shaft 39 with sprocket 40 thereon which is drivingly connected by chain 41 to sprocket 30 mounted on the side mower shaft 31.

The hydrostatic transmission, employed as the drives in the present lawn mower, convert mechanical energy at the input shaft into pressure energy in a nearly incompressible working fluid, and then reconvert the pressure energy into mechanical energy at the output shaft. The working fluid may comprise a suitable transmission fluid or oil such as known in the art. The purpose of this transformation of energy provides a means of varying the output torque, speed, and direction with a constant input speed.

In operation, the pressure within the hydrostatic transmission is variable and will increase and decrease automatically as the load on the transmission increases and decreases. The hydrostatic transmission essentially comprises three major components which include a variable displacement radial-piston pump, a fixed displacement piston motor, and a system of valves located between the pump and motor. By varying the displacement of the pumps, an infinite number of speeds are available at both the mowers and the ground wheels of the tractor so that the speed at which the mower units operate is independent of the speed of the tractor and vice versa.

Figure 4:
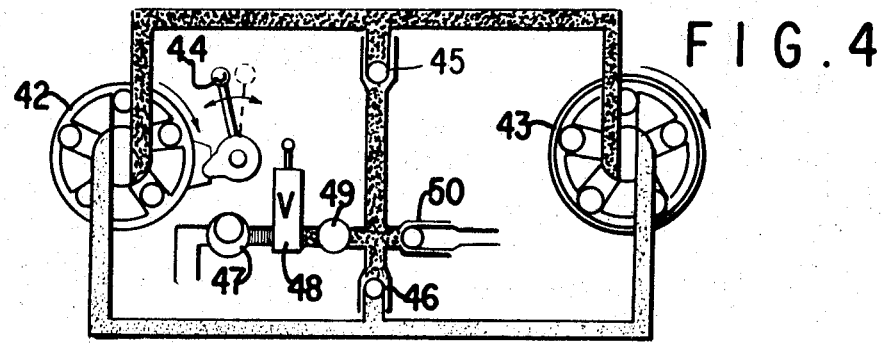
FIG. 4 is a flow diagram of a hydrostatic transmission used herein.

The operation of the hydrostatic transmission can be better understood by reference to the flow diagram of FIG. 4. The flow diagram shows a ball piston pump 42 and a ball piston motor 43 which rotate in the directions indicated by the respective arrows. There is further provided a shift lever 44 and low pressure directional valves 45 and 46. A charge and auxiliary roll pump 47 is connected to an auxiliary valve 48 which in turn is connected to a filter 49. Also provided is a low pressure reversing valve 50.

The auxiliary roll pump 47 functions as the inlet for the hydrostatic transmission circuit and distributes the reservoir oil. The roll pump functions to maintain flow and pressure in the auxiliary hydraulic circuit, to maintain some pressure on the low pressure side of the hydrostatic circuit so as to supercharge the variable displacement pump and to supply oil lost due to internal leakage in the hydrostatic circuit.

Following the flow circuit from this point, auxiliary pressure in established by a valve in the hydraulic valve 48 and oil then flows through filter 49 which removes particles of dirt and other foreign matter. One example of a suitable drive is that sold under the trademark "Marshallmatic" Model 10, a trademark of Eaton Yale & Towne for its hydrostatic transmissions.

For optimum control and power, the transmission is preferably operated at constant full throttle engine speed. Complete control of the tractor speed and the mower reel speed is accomplished through the use of the appropriate transmission control level. Thus, once the prime mover is operated, the speed of the tractor over the ground is controlled through a transmission control only, and the speed of the mower reels is controlled again by a transmission control only. Both of these speeds are controlled independently of each other, although they are provided with a common source of power, namely, the prime mover.

The use of hydrostatic transmissions in both the tractor drive and the mower drive offers numerous advantages. The operation of the tractor is simplified, fatigue of the tractor operator is significantly reduced, and the productivity of the mower and its versatility are significantly increased. In operation, a hydrostatic transmission provides a smooth speed change from full forward through zero to full reverse, all in a single control. Further, the hydrostatic transmission allows complete matching of power to the load, which is particularly important in driving the tractor over hilly ground such as would be found in golf courses. Also, positive control and dynamic braking are provided with such a hydrostatic transmission. Thus, the hydrostatic transmission eliminates the need for throttle adjustment, clutch action, and all shifting, including reverse in both the driving of the tractor and in the driving of the lawn mower unit reels attached to the tractor.

While the wheels are stationary, it is also possible to provide power lapping of the cutting reels by placing the cutter speed control lever in reverse, which in turn places the hydrostatic transmission in reverse. The operator may select the best reverse speed, depending upon the type of lapping compound used.

It will be understood that changes in various details of constructions and arrangement of parts may be made without departing from the spirit of the invention except as defined in the appended claims.

What is claimed is:

1. In a lawn mower, the combination of a tractor, lawn mower means attached to the tractor, a prime mover on the tractor, the tractor having ground wheels; a first hydrostatic transmission drivingly connecting said prime mover to drive the ground wheels, a second hydrostatic transmission drivingly connecting said prime mover and the lawn mower means, means for controlling individually the output speed of each hydrostatic transmission, and means connecting said transmissions to said prime mover, the driving speed of the lawn mower means being independent of the speed at which the tractor ground wheels are driven.

2. In a lawn mower as claimed in claim 1 wherein said lawn mower means consists of a plurality of reel lawn mower units.

3. In a lawn mower as claimed in claim 2 wherein the transmission driving reels of the lawn mowers can be reversed so that reels can be rotated in reverse direction to power lap the cutting edges of the reels.

4. In a lawn mower as claimed in claim 1 wherein said prime mover has an output shaft and both hydrostatic transmissions have their inputs drivingly connected to said prime mover output shaft.

5. In a lawn mower as claimed in claim 1 wherein said lawn mower means include a pair of side mowers on opposite sides of the tractor and mounted on a common shaft, and means for drivingly connecting said common shaft to the output of said second hydrostatic transmission.

6. In a lawn mower as claimed in claim 5 wherein said lawn mower means comprise a front mower in front of the tractor with a driven shaft and means drivingly connecting said front mower driven shaft and said side mowers common shaft.

7. In a lawn mower as claimed in claim 6 wherein said drive means comprises a drive chain and sprockets on said shafts.

8. In a lawn mower as claimed in claim 1 and comprising a drive chain drivingly connecting the inputs of said first and second hydrostatic transmissions to the output of said prime mover.

* * * * *